United States Patent [19]

Carroll, Jr. et al.

[11] 3,942,969

[45] Mar. 9, 1976

[54] DELAYED RELEASE NUTRIENTS FOR MUSHROOM CULTURE

[76] Inventors: Alban David Carroll, Jr., Hartz Road, R.D. 3, Fleetwood, Pa. 19522; Lee C. Schisler, 317 S. Spark St., State College, Pa. 16801

[22] Filed: May 21, 1974

[21] Appl. No.: 471,893

[52] U.S. Cl............................................ 71/5; 47/1.1
[51] Int. Cl.²..................... C05F 5/00; A01G 1/04
[58] Field of Search............................. 71/5; 47/1.1

[56] References Cited
UNITED STATES PATENTS

| | | | |
|---|---|---|---|
| 2,005,365 | 6/1935 | Giacinto | 47/1.1 |
| 3,560,190 | 2/1971 | Hughes et al. | 47/1.1 X |
| 3,828,470 | 8/1974 | Stoller | 71/5 X |
| R22,202 | 10/1942 | Stoller | 71/5 |

OTHER PUBLICATIONS

Schisler, Applied Microbiology, "Stimulation of Yield in Cultivated Mushroom by Vegetable Oils", Vol. 15, No. 4, July 1967, pp. 844–850.

*Primary Examiner*—Charles N. Hart
*Assistant Examiner*—Ferris H. Lander
*Attorney, Agent, or Firm*—Oblon, Fisher, Spivak, McClelland & Maier

[57] ABSTRACT

Denatured protein is used as a nutrient supplement for the stimulation of the growth of mushroom mycelium. The denatured protein is admixed into the compost growing medium before or shortly after spawning. A synergistic effect is attained by admixing a vegetable oil, or fish oil with the denatured protein.

16 Claims, 8 Drawing Figures

DELAYED RELEASE NUTRIENTS FOR MUSHROOM CULTURE

BACKGROUND OF THE INVENTION

1. Field of the Invention

This invention relates generally to commercial mushroom production, and more particularly to the stimulation of mushroom growth by the supplementation of nutrients which are directly utilized by the mushroom.

2. Description of Prior Art

Commercial mushroom growing depends on composted materials as a medium for growth. A compost is first formed and is treated so that the microorganisms present are stimulated to make the compost suitable for colonization by the mushroom.

It has heretofore been known to supplement the compost with various additives including dried blood, cottonseed meal, and many other supplements. These supplements, however, have been added for the purpose of feeding the microorganism population of the compost in order to more actively transform the compost material into a food source for the mushroom mycelium. Little, if any, of the supplements used in the prior art remain available to stimulate mushroom growth directly. The tremendous increase in heat evolution when readily available foods are added to a compost is evidence for this conversion and relatively complete utilization.

It was reported by Schisler et al, Mushroom Science V, pages 150–164 (1962), and Sinden et al, Mushroom Science V, pages 267–280 (1962) that attempts at directly feeding the mycelium rather than indirectly as in the past, were successful and produced marked stimulation of mushroom crop yields, when certain uncomposted nutrients were added to the compost at the time the mushroom mycelium is spawned into the compost, or at the time of casing, i.e., the covering of the compost with a layer of topsoil or peat, through which the developing mycelium grows and on which the mushrooms form.

However, while a significant 10% crop increase was found when small amounts of these supplements were added at spawning, higher rates of supplementation did not further increase the yield. This limited effect seems to be attributed to the fact that the addition of the uncomposted supplements not only stimulated the mycelial growth of the mushroom, but also promoted the growth of the competing microorganisms present in the compost, which tended to reduce the availability of the added nutrients for the mushroom mycelium, and tended to hinder the development of the slower growing mushroom mycelium.

The addition of nutrients which could be utilized directly by the mushroom mycelium, seemed to also present other problems. For one, since the use of direct utilizable nutrients also resulted in an intense stimulation of microbial activity, a very significant temperature increase in the spawned compost occurred, which endangered or destroyed the mushroom mycelium.

Another difficulty with the use of direct utilizable nutrients was that the stimulated crop yields occurred only in the first few flushes. Mushrooms are grown in a series of flushes, or harvests. A single spawning into a compost may produce 5 to 8 flushes, and in some instances as many as 12, or as few as 4 flushes. The remaining compost is then discarded. When the direct utilizable nutrients were added, a significant yield increase was observed in the early flushes, but the nutrients seemed to be rapidly depleted so that little or no yield stimulation was observed in later flushes.

In general, it was found that supplementation of the compost with the direct utilizable nutrients after the mushroom mycelium had become established, such as just before casing, was much more successful, and increased yields were observed which were roughly proportioned to the quantity of nutrients added. This improvement seems to occur because once the mushroom mycelium has begun to develop, its inherent antibiotic activity tends to reduce the competing microorganism population so that only the mycelium obtain the nutrient stimulation.

Therefore, while it would appear most desirable to introduce the nutrients into the compost after the mushroom mycelium has already become well established, such as at the time of casing, certain other practical factors mitigate against supplementation of that stage. One problem is that the increased metabolic rates of the mushroom mycelium can be so severe in the latter stages as to destroy the crop, which again acts as a limiting factor on the quantity of nutrients which could be added.

Unless the mushroom mycelium has become uniformly established throughout the compost, the addition of the supplement could result in spawning the growth of harmful competing molds in those areas of low mycelium colonization.

Another difficulty with supplementation at the time of casing, is that it would require major changes in commercial production techniques. Once the mushroom mycelium has become established, the compost becomes intricately matted together. In order to obtain a uniform distribution of the nutrient throughout the compost, it is necessary to separate the compost using rather sophisticated mechanization.

A still further difficulty of supplementation at the time of casing is that pathogens which are not destroyed by the mushroom mycelium, are more likely to be present at the time of casing than at the time of spawning Usually the compost is pasteurized just before spawning, but pathogen growth may occur unhindered thereafter. Mixing the nutrients into the separated compost at the time of casing could thus result in spreading the pathogens throughout the compost.

The current state of the technology is, therefore, that it is known that nutrients which are directly utilizable by the mushroom mycelium will stimulate growth and increase yield. However, if the nutrients are admixed into the compost before spawning of the mycelium, the practical aspects of mixing are commercially feasible, but the extent of crop stimulation is necessarily limited by the amount of heat evolution, degree of stimulation of competing microorganisms and by the fact that the stimulation of mushroom growth seems to be restricted primarily to the first several flushes. On the other hand, supplementation of the compost at the time of casing seems to result in excellent increases in crop yield, however, the degree of heat evolution caused by the increased metabolic rates of the mushroom mycelium, the practical difficulties in mixing, the danger of the spread of pathogens or the stimulation of competing molds in areas of poor mycelium colonization renders supplementation at this stage generally impractical for commercial utilization.

OBJECTS OF THE INVENTION

Accordingly, one object of this invention is to provide a means of providing nutrients to enhance the growth of mushroom mycelium which will provide a greater crop yield than heretofore obtainable.

Another object of this invention is to provide a means of providing nutrients to enhance the growth of mushroom mycelium whereby the nutrients are admixed into the compost at the period of spawning, without stimulating a large increase in competing microorganism population.

A further object of this invention is to provide a means of supplementing the nutrient supply available for mushroom mycelium growth whereby the effect of the supplementation extends beyond the first few flushes of the mushroom production period.

These and other objects of this invention have now been attained by using denatured protein as a nutrient supplement, which is admixed into the compost before or after spawning, but prior to the establishment of the mushroom mycelium in the compost. A synergistic effect is attained by admixing a vegetable or fish oil with the denatured protein.

DETAILED DESCRIPTION OF THE PREFERRED EMBODIMENTS

According to the present invention, a denatured protein is used as the nutrient supplement to enhance the crop yield of mushrooms. It has been found that the denatured protein will be gradually available to the mushroom mycelium, but is essentially not available to the competing microorganisms present in the compost. The mushroom mycelium seems to be able to resolubilize the insoluble, denatured protein, so as to make the protein available as a nutrient source. This effect seems to be a result of the fact that a by-product of the mushroom mycelium metabolic activity is an acidic material which tends to change the pH of the surrounding compost to an acid condition. It is not completely clear whether the pH change resolubilizes the protein or whether enzymes, of the type which can attack denatured protein, and which are produced concurrently with the pH change, renders the denatured protein available to the mycelium. The degree of pH change, however, seems to be a function of the extent of growth of the mycelium. At the initial growth stages, very little pH changes would occur so that very little protein solubilization would occur. As the growth progresses, increasing amounts of protein would be solubilized, but at the same time the mycelium would have an increasing capacity to utilize the protein.

It might have been expected that once the denatured protein has been resolubilized, it would be available for stimulation of competing microorganisms. However, it seems that by that period of mycelium growth in which large amounts of the denatured protein are solubilzed, the antibiotic properties of the mycelium in the compost become so dominant, that it either destroys the competing microorganism population, or enables the mycelium to outcompete most deleterious microorganisms for the nutrient supplement.

By "denaturing" of the protein is meant a change in the molecular structure of the globular proteins that may be induced by heating the protein, or by exposing it to formaldehyde, acids or alkalies. Denaturation reduces the solubility of proteins and prevents crystallization. It involves the rupture of hydrogen bonds so that the highly oriented structure of the native protein is replaced by a loose, more random structure, and involves an alteration in the degree of hydration. A wide variety of different proteins can be denatured and used as a supplement in accordance with this invention. For instance, suitable proteins include the simple proteins, such as the albumins, for instance serum albumin, ovalbumins or lactalbumin; the globulins, such as found in seeds and nuts; the prolamines, such as found in cereal seeds, e.g., zein; the glutelins, also found in cereal seeds; or the protamines, such as are found in fish sperm. Also usable are the conjugated proteins, for instance the glycoproteins, such as the mucins, the phosphoproteins, such as casein or vitellin or egg yolk; or the chromoproteins, such as the hemocyamins. Most preferred are those proteins derived from vegetable sources, which are in general more effective than those derived from animal sources. For instance, proteins derived from cottonseed, soybean and peanuts, or mixtures thereof provide quite a good result.

Further exemplary of mutable protein sources usable in this invention are fish protein sources, such as fish meals, fish solubles or the like; malt sprouts; meals from linseed, sesame, peanut, corn germ, castor, safflower, corn gluten, wheat germ, palm kernel, sunflower seed, walnut oil, alfalfa leaf, coconut oil, rape seed oil; Brewer's yeast products; casein; peptones, and Brewer's grains. The quantities of carbohydrates often present in such protein sources is objectionable since the carbohydrates are utilizable by the competing microorganisms. Although objectionable, however, they can be tolerated in some amounts since once the mushroom mycelium becomes established it will outcompete those microorganisms. Likewise, soluble sugars or starches which will mold easily are objectionable, however, can be tolerated in small amounts.

For best effects, the nitrogen content of the protein source should be a minimum of about 4% up to 15%, which corresponds to 100% protein.

Denaturing of the protein can be conducted by any of the methods known in the art. For instance, it is known that proteins will be denatured by exposing to heat or by a wide variety of miscible solvents, such as carbon tetrachloride, hexane, toluene, methylene chloride, or ethylene dichloride. A wide variety of organic and inorganic acids and salts are known to denature proteins, such as hydrochloric acid, nitric acid, sulfuric acid, phosphoric acid, acetic acid, propionic acid, or the ammonium or alkali salts thereof. Also usable are the organic anhydrides, such as succinic, maleic, phthalic, glutaric and the lower alkyl ($C_1$–$C_3$) derivatives thereof. Also useable are the aldehydes such as formaldehyde, glyoxal, acrolein and crotonaldehyde. Vegetable tannins can also be used to provide insoluble complexes with protein substances.

Particularly good results have been attained by denaturing the protein with liquid or vapor formaldehyde treatment or by heating the protein to a denaturing temperature for 1–10 hours. Reaction with formaldehyde acts to harden the protein, and decrease its water solubiltiy. It also increases the resistance of the protein to the action of enzymes and chemical reagents. These effects are due primarily to the cross-linkage of protein chains and micellar units by methylene bonds connecting reactive groups. Protein groupings taking part in formaldehyde reactions include primary amino and amide groups, guanidyl groups, secondary amide groups in peptide chains, indole groups, etc. (Walker, J. F. (1964) Formaldehyde, 3rd edition, pp. 399–404, N.Y. Reinhold Publ. Corp.)

Denaturing is also described as a reaction involving the formation of methylene bridges and other cross-linkages between the protein chains.

When heat treatment is used as the denaturing means, temperatures of from 250°F to 450°F and preferably 300°F to 400°F are used. The particular temperature, of course, will depend upon the particular protein being denatured. This technique of denaturing is quite conventional.

Another acceptable supplement was obtained by combining physical treatment with chemical denaturing of the protein to decrease the availability of the supplement to the competing microorganisms. The physical form of the supplement can naturally effect its availability. For instance, if the protein is in a compacted form, such as exists in pellets, the exposed surface area of the protein per weight of supplement is greatly reduced. This would render a large quantity of protein unavailable for immediate use by the microorganisms or by the mushroom mycelium, thereby aiding in extending the period of supplementation to later flushes.

When the denatured protein is pelleted, binders such as the lignins, and in particular the lignosulfates, have been found to be useful, although are not essential. Other materials, such as bentonite and other clays, starch and/or water may be added to assist in the pellet formation.

Of course, if desired, the protein can first be pelleted and then denatured, however, in this instance the denaturing effect may not extending beyond the surface layer of the pellets. It is usually best, to at least partially denature the protein before forming the pellets and then if desired, further expose the pellet to a denaturing solvent such as formaldehyde.

Another technique for combining physical modification with denaturing, is by spray drying of the protein. One such method is described in Scott et al, Agricultural Science Review, Fourth Quarter, Pages 25–28, (1970). According to that technique spray dried droplets of a soluble protein-lipid mixture were prepared. Electron photomicrographs of cross-sections of the spray dried material showed that the micro-drops of lipids were encapsulated within a protein coat. The protein coat was then denatured by formaldehyde treatment.

Although formaldehyde treatment and heat treatment seem to be among the more important denaturing methods, any denaturing solvent might accomplish a similar result.

Especially good synergistic effects can be attained if a vegetable oil or fish oil is admixed with the denatured protein. The presence of the vegetable oil stimulates the mushroom to fruit thereby providing further increases in crop yield. Suitable such vegetable oils include safflower, cottonseed, soybean, corn, olive, linseed, rape seed, sesame, wheat germ, sunflower seed, palm or the like.

One difficulty with the use of vegetable oils, however, is that it is immediately available to the competing microorganisms so that its presence can be self-defeating. This difficulty can be avoided however, by spray drying a mixture of the protein and oil. Spray drying results in the oil being encapsulated by the protein after which the protein can be denatured. This technique removes the oil until the mushroom mycelium has matured sufficiently to obtain effective utilization of the oil without causing an undesirable stimulation of competing microorganisms.

When a vegetable oil is used, it can be used in quantities of from 1% to 65% oil/protein, although for an amount of between 50% – 65%, it is preferable to use the oil in a spray dried form as decribed above.

In carrying out this invention, a conventional compost is first prepared. Suitable compost materials include horse manure or fermented hay and corn cob. The compost is usually pasteurized to kill harmful pathogens, and then the supplement of this invention is admixed therewith. It is desirable to utilize about ½ – 2 pounds supplement/4 square feet, surface area of compost (based on a 5 inch compost depth), depending upon the particular protein, the purity of the protein and the species of mushroom being produced. It is possible to go beyond 2 pounds, however, the introduction of too much supplement can result in toxic effects which could destroy the crop. In practice, various depths of compost per surface area may be used (i.e., not restricted to 5 inch depth, but a rate of supplementation is based on that depth.

The mushroom mycelium is then spawned into a bed of the compost. About 1 quart of the mycelium is added to about 6 to 40 or 50 square feet of bed surface. The mycelium and supplement should be admixed to the same depth into the bed at a rate calculated on that depth.

The supplement should be admixed into the bed either before or after the spawning, but should preferably take place before the mycelium has become established, as explained above.

About 2 – 3 weeks after spawning, the beds are ready for casing. In casing a layer of topsoil or peat is placed on top of the compost bed, through which the mushroom mycelium will grow.

In the usual instance, 4 to 9 or up to 12 breaks or flushes will be obtained from a single composting, after which the compost is destroyed. However, one of the very interesting aspects of the present invention, from a commercial point of view, is that now the frequency of the destruction of the compost can be reduced. This can mean that re-composting might be required only once a year, instead of every couple of months, as is now the practice in the industry.

A wide variety of mushrooms can be supplemented by the techniques of the invention including *Agaricus bisporus* (cultivated mushroom), *Agaricus compestris, A. edulis, A. augustus, Boletus edulis, B. mirabilis, B. zelleri, B. chrysenteron, B. luteus, Cantharellus cibarius, C. clavatus, Armillaria ponderosa, Armillaria mellea, Pleurotus ostreatus, Volvariella volvacea, Coprinus comatus, Calvatia gigantea, Polyporous sulphureus, Morchella esculenta, Morchella angusticeps, Morchella conica, Morchella crassipes, Lentinus edodes, Psilocybe cubensis, P. Mexicana,* and *Panaeolus venenosus.*

Having generally described the invention, a more complete understanding can be obtained by reference to certain specific examples, which are included for purposes of illustration only and are not intended to be limiting unless otherwise specified.

EXAMPLES

In the following Examples, the nutrient supplements were prepared as follows:

Preparation 1

Pellets

Water and peanut oil were thoroughly mixed into the supplement just prior to pelleting in a pellet mill at The Pennsylvania State University Mink Research Center. The supplement was passed through the mill and oven dried at 212°F for 24 hours, after which the fines were removed by sieving. Pellet hardness and reduction of fines was enhanced by admixing 3% lignosulphate pellet binders prior to pelleting. The supplement used was a commercially available supplement known as Pharmamedia, which is a form of cottonseed protein. In one instance, the supplement was denatured with formaldehyde, as described below, prior to pelleting. In another instance, the formaldehyde treatment occurred after pelleting. In a still further preparation, the supplement was pre-denatured before pelleting which was followed by a post-denaturing treatment.

In addition to Pharmamedia cottonseed protein, other supplements were tested including soybean protein grits, which is a form of soybean protein, ground soybean prepared by grinding whole soybeans through a 0.078 inch mesh screen, and soybean meal, which is a processed meal having the oil removed. These materials were used as representative sources of proteins in the following preparations as well.

Preparation 2

Formaldehyde Denaturing

Vapor Treatment

Approximately 2 pounds of each of the supplements above described was placed into a hooded oven in a layer of less than ¾ inch in thickness. A 37% aqueous solution of formaldehyde was placed into a large area flat span (1½ foot area) on the bottom of the oven and the temperature was raised to 212°F. The oven was equipped with a circulation fan which aided the evaporation of the formaldehyde and the distribution of the vapors through the supplement. Under the conditions, 3.17 quarts of formaldehyde solution was vaporized over a period of 32 hours. The supplement was then allowed to dry for an additional 16 hours.

Liquid Formaldehyde Denaturing

One volume of supplement was mixed with six volumes of 4% aqueous formaldehyde solution. The mixture was allowed to stand for 1 hour with occassional stirring. The excess solution was poured off and the supplement was strained between each washing. It was then placed into trays in a 1½ inch layer and dried in a vented over at 212°F for 48 hours. Further details of this procedure are described in Ferguson et al Australian Journal of Science 30: 215–218.

Low Volume Liquid Formaldehyde Denaturing

A 10% aqueous formaldehyde solution was admixed with the supplement at the rate of 2.3 fluid ounces solution to 1 pound supplement and thoroughly mixed and was then placed into an air-tight container and incubated at room temperature for not less than 20 hours. The supplement was then dried in a vented over at 212°F for 12 – 14 hours.

Preparation 3

Heat Denaturing

Cottonseed protein (Pharmamedia) was heated to 375°F for 2½ hours to effect denaturing. (This product is produced commercially as Cinocoa 150.)

Preparation 4

Formaldehyde denatured spray dried protein

Using the technique of Scott et al, Agricultural Science Review, Fourth Quarter: 25–28 (1970), spray dried cottonseed protein was prepared. 1.86 pounds of the protein was admixed with 3.17 quarts of hot water and 0.75 quarts of peanut oil. The mixture was blended in a Waring blender for 4–5 minutes. The resulting blend was heated to 150°–155°F in a hot water bath and then was sprayed into a pre-heated chamber (185°–190°F) under a spray pressure of 1000–1500 psi. The chamber was then allowed to cool to room temperature. The spray dried particles were then denatured with formaldehyde as above described to form a denatured crust of protein surrounding encapsulated peanut oil.

These preparations were then tested according to the following procedures.

Crop Tests

The compost was prepared according to the short method of composting described by Sinden et al. Mushroom Science I; 52–59 (1950) using wheat straw-bedded horse manure. Outdoor composting required 7 days with turnings on days 0, 2, 5, and 7. The compost moisture was raised to 75% on a wet basis by day 7 with as much water as possible, without leaching, being added on days 0 and 2, little or no water on day 5, and generous water on day 7. Brewer's grains was added to the compost during the first 2 turns at the rate of 50 pounds per dry ton of horse manure, and gypsum, at the rate of 75 pounds per dry ton. The nitrogen content at filling average 1.78%. On day 7 the compost was filled into trays 6 inches deep and placed into the indoor rooms. The "low temperature" method of Sinden, calls for maintenance of compost temperatures between 115° and 130°F, and accordingly as large a compost-air temperature differential as possible, was used. The compost was pasteurized on the third day of the indoor preparation, by increasing the air temperature to 140°F for 2 hours. The nitrogen content at the end of the indoor treatment was approximately 2.15%. After the indoor treatment, all the compost was emptied into one pile. As the tared trays were refilled, the compost was spawned (mixed with sterilized rye grain thoroughly grown through with mushroom mycelium) at the rate of 0.24 pounds of spawn per tray. Each tray was filled in four layers, equal portions of the 0.24 pounds being mixed into each layer. The trays were again weighed to assure that each tray contained the same amount of compost. After spawning, all trays were placed into controlled environment growing rooms. The relative humidity was kept at 95 to 98%, and the compost temperatures between 70° and 75°F. After 16 days of spawn growth, a 1.2 to 1.4 inch layer of pasteurized topsoil was placed over the compost. The soil was then watered, its moisture content being raised to field capacity. The air temperature was gradually lowered to 59°F over a 2 week period. Mushrooms matured in 16 to 18 days and were harvested for a 56 day picking period (7 flushes of 8 days each). The cut weight and number of mushrooms harvested from each tray were recorded daily. A white "strain" of mushrooms (culture 310 from The Pennsylvania State University culture collection) was used throughout this investigation.

Supplementation at Spawning

When the crop was used to test supplements at spawning the unpelleted supplements were added to each layer of the compost just before spawning the layer. The pelleted supplements were added immediately after the spawning of each layer. When peanut oil was added in combination with a dry supplement the sequence of incorporation into each layer was oil-supplement-spawn. The trays were filled at 45 pounds of wet compost or 14 pounds of dry compost per tray.

Supplementation Rates

Dry supplements were added on a protein equivalent basis. The ratios of these supplements to compost used was equivalent to the ratios shown to be optimum by Sinden et al. Mushroom Science V 267–289 (1962), for supplementation at casing. In some treatments 1½ times this amount was used to investigate the effects of increased supplementation.

Experimental Design

Each treatment was replicated in 6 trays, each having a surface area of 4 ft$^2$ and a depth of 6 inches. Normally 16 treatments were used per test, giving a total of 96 trays. An analysis of variance was performed on mushroom yields and the least significant difference among the means calculated.

Spawn Growth Temperature Trends

After spawning the temperatures of the variously supplemented and unsupplemented trays were recorded daily. Two readings were taken from random locations within each tray in the growing room.

Spawn vs Mold Growth Test

This test was designed to evaluate supplements as to their ability to resist molding by the microflora of the compost and their ability to stimulate mycelial growth. The procedures were as follows:

A random sample of compost was prepared in the conventional manner, and was thoroughly mixed to assure uniformity. Preweighed supplements were then mixed through 150 grams of compost and the compost spawned with 0.81 grams of strain 310 grain spawn. The compost was then placed into 12 ounce jars and incubated at 70°F and 90% relative humidity.

When a combination of supplements was used, the peanut oil was mixed into the compost first. When the supplement was a pelleted material the compost was spawned first and then the pellets added.

The visible mold development on the supplement was recorded on a Mold Growth Index of 0 to 10, 10 being 100% coverage. The results were recorded as the mean of the Index. A Spawn Growth Index, ranging from 1 to 30, was used to record the extent and density of the spawn growth. In early stages of spawn growth the diameters of the mycelial growth radiating from grains of spawn were used to rank the various treatments. After most of the growth had coalesced the density of the growth was relied upon.

This procedure was designed to test on a small scale the effects of supplements on spawn and mold growth in conditions corollary to the crop test. The ratios of spawn and supplement to compost were identical to the ratios used during crop tests. It is not possible to predict the degree of crop stimulation from mycelial stimulation but the correlation between crop reduction, or lack of yield stimulation, and greatly inhibited spawn growth is strong. Thus although this test is not useful in predicting the degree of crop stimulation of various supplements, it is useful in identifying those supplements which greatly inhibit spawn growth and adversely affect crop yield.

The Mold Resistance Test

This test was designed to identify large qualitative differences in the mold resistance of supplements treated in different ways. Although these supplements were inoculated with a known concentration of *Penicillium sp* spores, no attempt was made to control the initial microflora of the supplement. Thus the inoculated mold was not the only organism developing on the supplement.

The *Penicillium sp* was used to infest supplements to assure the presence of microorganisms known to naturally contaminate supplements and grow on them in the compost.

Some supplements (Pharmamedia plus peanut oil, spray dried Pharmamedia) which molded readily in this test stimulated spawn growth in compost. The usefulness of this test is limited to the identification of large differences in mold resistance, such as that imparted by formaldehyde treatment, and some general molding trends.

Temperature Recordings

The air temperature during spawn run was adjusted to keep the check trays at 70–72°F, thus no attempt was made to control the temperatures of the supplemented trays.

The degree to which supplements stimulate microbial activity in the compost, and the timing of this occurrence, can be monitored by comparing the compost temperatures of supplemented treatments to the temperatures of the checks (unsupplemented treatments). When visual observations confirm that spawn growth, and not foreign mold growth, occurred during periods of heat production, then direct stimulation of the mycelium by the supplement can be monitored by temperature recordings.

Since one of the problems is excessive heat production following supplementation, such data are essential in evaluating the delay and gradual release of supplements treated in various ways. A delay in heat production represents a delay in supplemental availability, while a reduced heat intensity suggests that availability of the supplement is gradual rather than instantaneous.

Figure 1A:
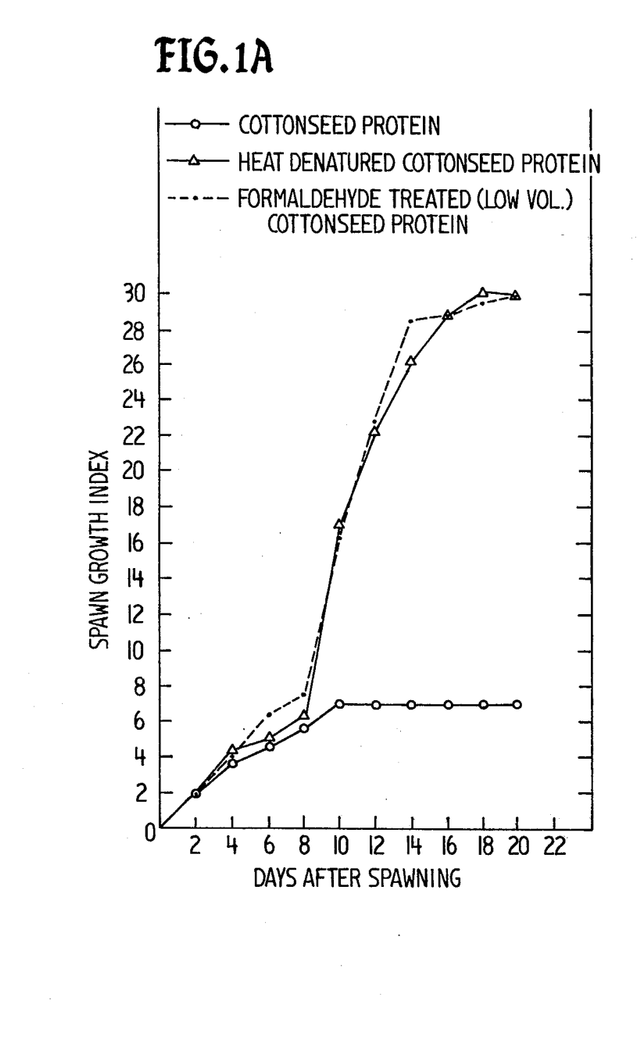

The results of these tests are shown first in the accompanying figures. FIG. 1A shows that for formaldehyde denatured cottonseed protein (Pharmamedia) and for heat denatured cottonseed protein (Cinocoa 150) the degree of spawn growth is significantly higher than for non-denatured cottonseed protein.

Figure 1B:
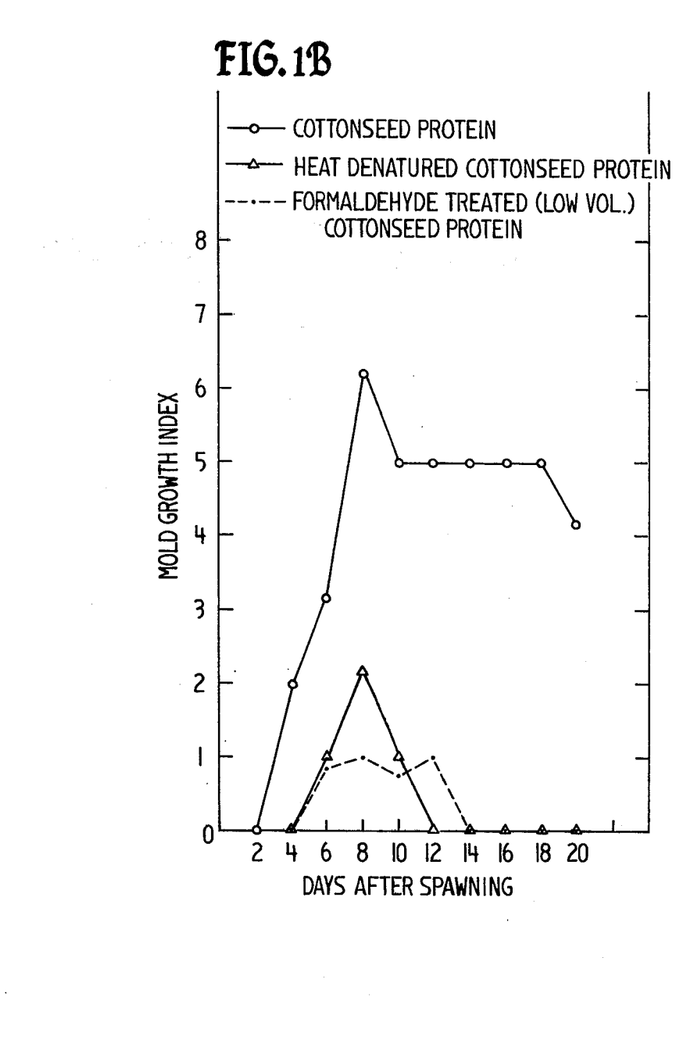

(FIG. 1B). The mold growth index, shows that the degree of mold growth is 3 to 6 times higher for non-denatured cottonseed protein, as compared with the denatured protein. Although some mold growth was present when denatured protein was used as the supplement, no mold growth was visible after 16 days, by which time the mushroom mycelium had fully grown over the supplement and compost.

Figure 2A:
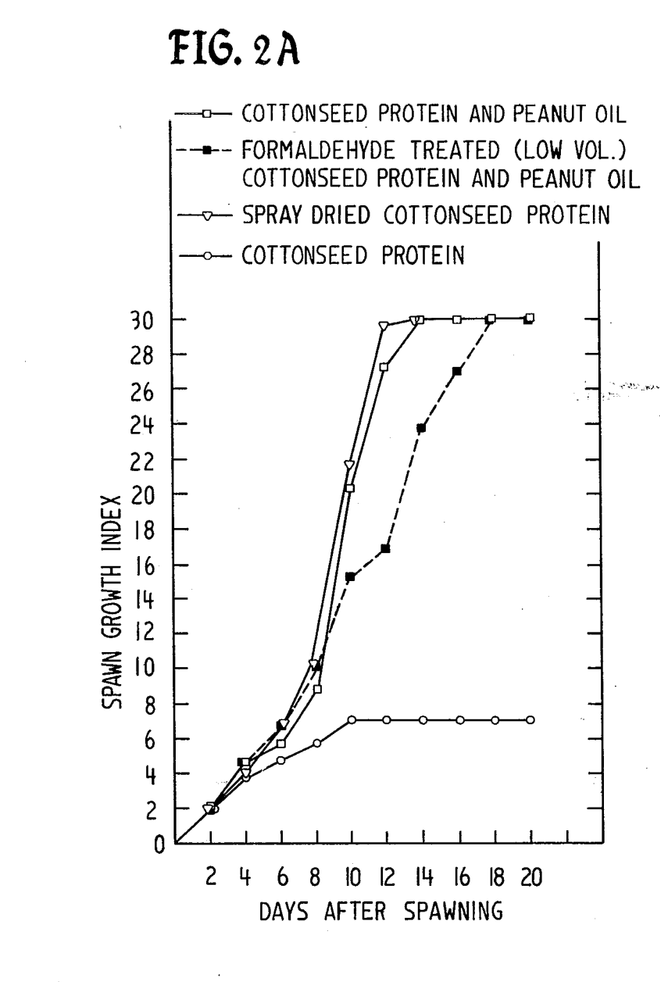

The addition of peanut oil also stimulates spawn growth, as can be seen from FIG. 2A. Also as can be seen from FIGS. 2A and 2B, the use of spray dried cottonseed protein provides very high spawn growth, however, it also provides very high mold growth as well.

Figure 2B:
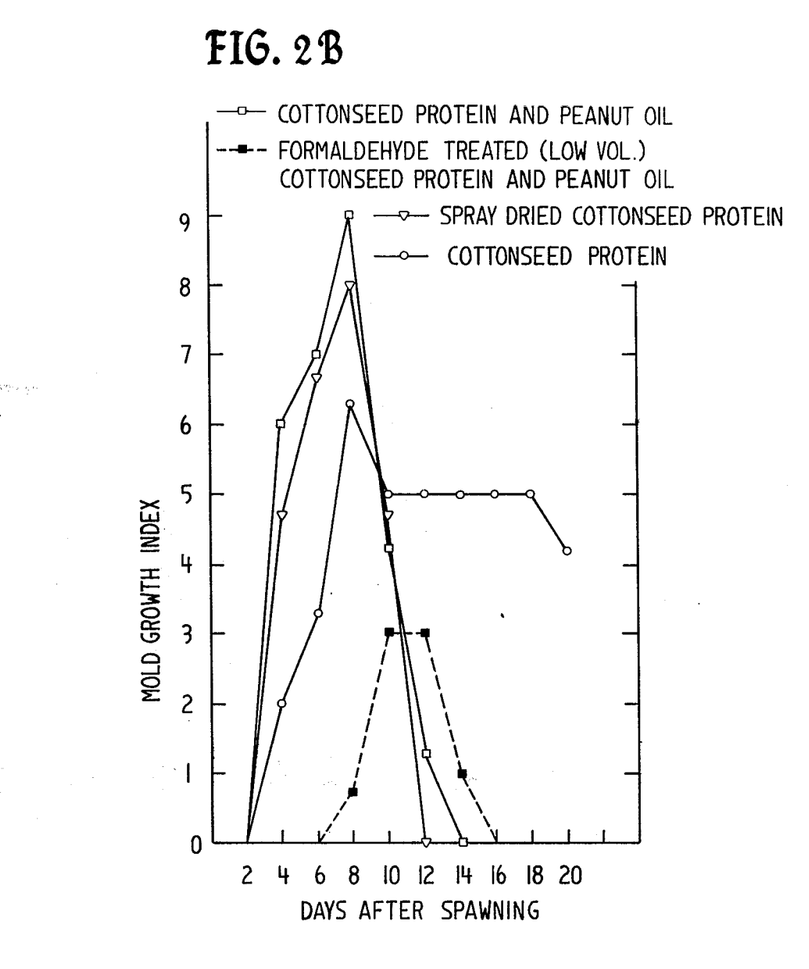

The denatured spray dried cottonseed protein, however, shows very high spawn growth with very little mold growth.

Figure 3A:
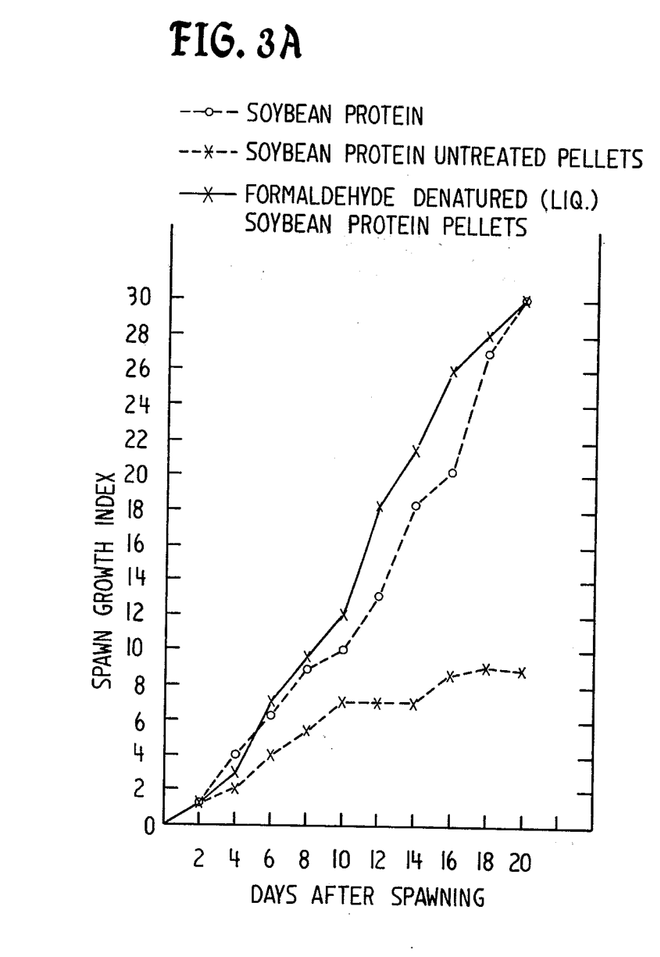
Figure 3B:
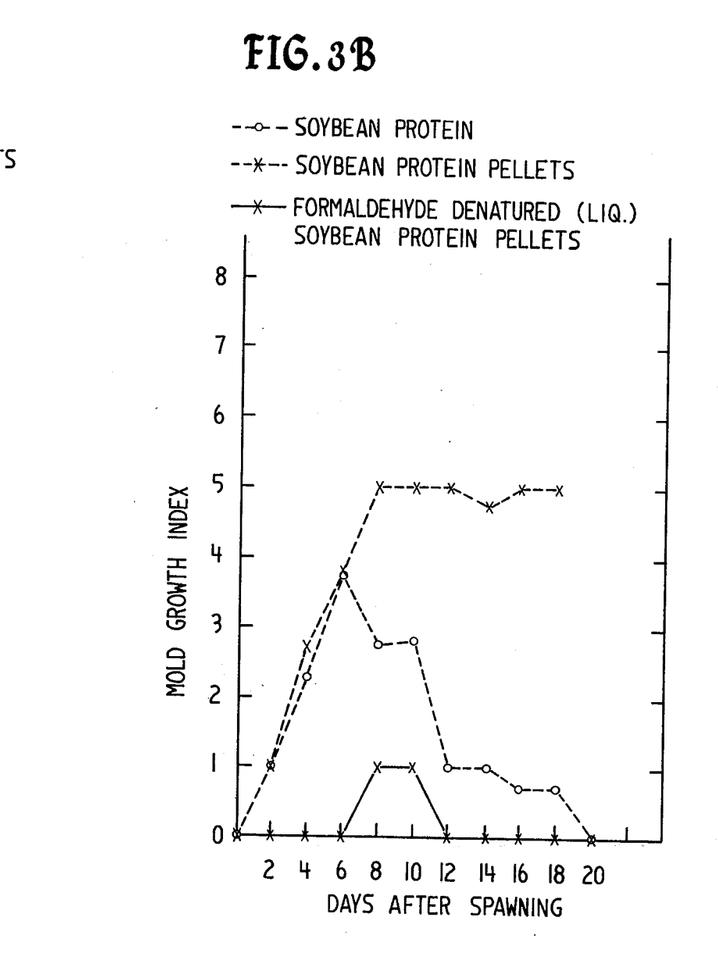

Similar results were found with soybean protein, as can be seen from FIGS. 3A and 3B.

Figure 4:
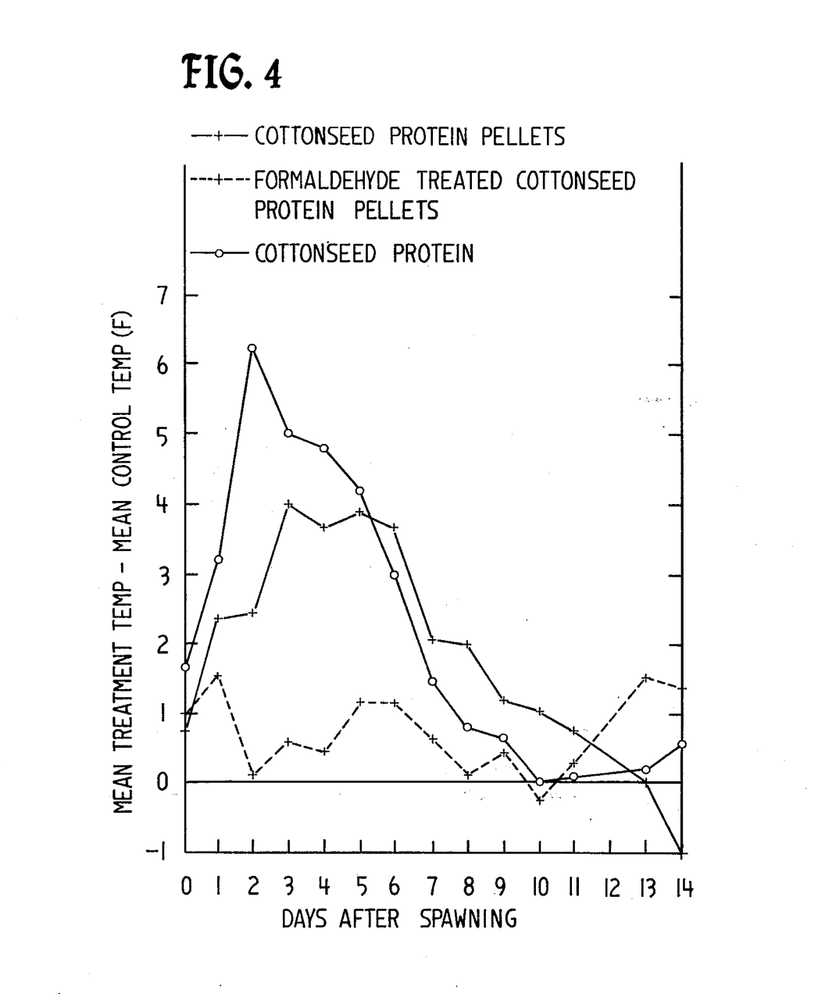
Figure 5:
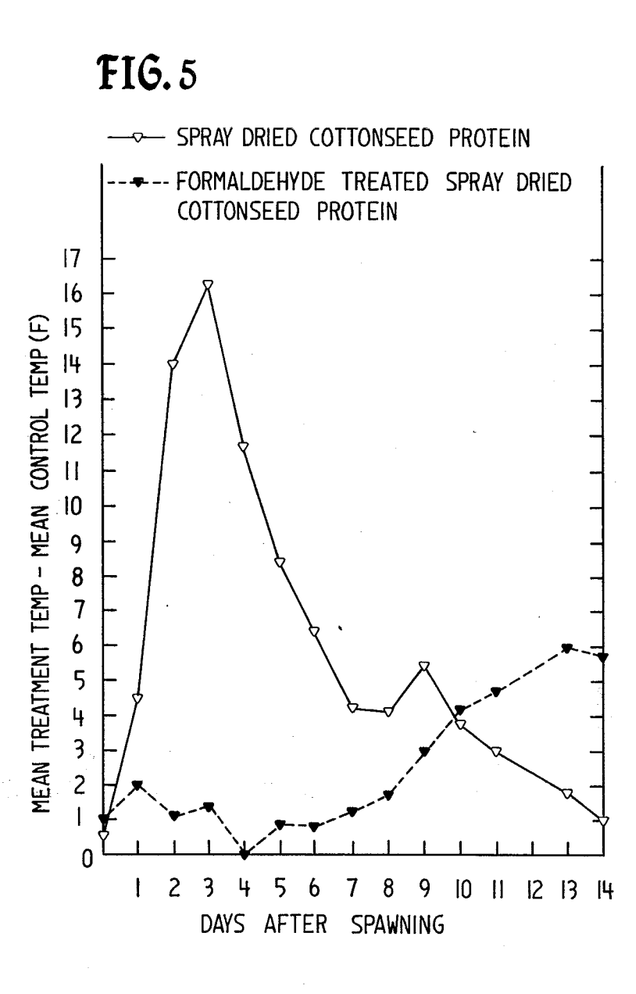

FIGS. 4 and 5 show that the heat production for denatured protein was lower, as compared with non-treated protein, at the early stages following introduction into the compost, which is evidence of very low microorganism metabolism. As the mushroom mycelium colonized the compost, however, it utilized an increasing quantity of the protein and accordingly, the heat generated increased, evidencing increased mushroom mycelium metabolic activity.

Crop Yields

As shown in Table 1, formaldehyde treated cottonseed protein and heat denatured cottonseed oil stimulated yield significantly as compared to the control and non-denatured protein. Cottonseed protein pellets did not stimulate yield significantly as compared to the controls, and formaldehyde denatured cottonseed protein pellets did. The addition of peanut oil to cottonseed protein and the spray dried cottonseed protein increased yield significantly, as compared to cottonseed protein and the controls, while spray dried cottonseed protein yield was also significantly higher than those for the peanut oil controls. All denatured cottonseed protein supplements, with peanut oil added (formaldehyde denatured cottonseed protein plus peanut oil, heat denatured cottonseed protein plus peanut oil and formaldehyde denatured spray dried cottonseed protein) stimulated yields significantly as compared to the control and cottonseed protein supplemented trays. In addition, formaldehyde denatured spray dried cottonseed protein and heat denatured cottonseed protein plus peanut oil supplemented trays yielded significantly higher than the peanut oil control or the heat denatured cottonseed protein treatments.

Ground soybean significantly increased yields above the controls. Ground soybean plus peanut oil significantly increased yields above those of the control, peanut oil supplemented or ground soybean supplemented trays. Formaldehyde denatured ground soybean supplemented trays yielded significantly higher than the control, formaldehyde denatured cottonseed protein supplemented or untreated ground soybean supplemented trays. Formaldehyde denatured ground soybeans plus peanut oil significantly increased yields above the control, formaldehyde denatured cottonseed protein plus peanut oil supplemented, peanut oil supplemented and formaldehyde treated ground soybean supplemented trays.

Table 1

Effects of Supplementation at Spawning on Mushroom Yield From Flushes 1–7

| Supplement | Amount Added Per Tray | Yield (lbs/ft$^2$)[b] |
|---|---|---|
| Control | | 2.17 |
| Peanut Oil Control | 9.8 fl oz(290 ml) | 2.79 |
| Cottonseed protein | .56 lbs. | 2.15 |
| Cottonseed protein + Peanut Oil | .56 lbs +9.8 fl oz | 3.17 |
| Formaldehyde Denatured cottonseed protein | .56 lbs | 2.82 |
| Formaldehyde Denatured cottonseed protein +Peanut Oil | .56 lbs+9.8 fl oz | 3.13 |
| Spray Dried cottonseed protein | 1.04 lbs | 3.36 |
| Formaldehyde Denatured Spray Dried cottonseed protein | 1.04 lbs | 3.52 |
| Heat denatured cottonseed protein | .56 lbs | 2.88 |
| Heat denatured cottonseed protein +Peanut Oil | .56 lbs | 3.42 |
| Cottonseed protein Pellets | .56 lbs | 2.09 |
| Formaldehyde Denatured cottonseed protein Pellets | .56 lbs | 2.56 |
| Ground Soybean | .89 lbs | 2.83 |
| Ground Soybean +Peanut Oil | .89 lbs+9.8 fl oz | 3.50 |
| Formaldehyde denatured Ground Soybean | .89 lbs | 3.26 |
| Formaldehyde denatured Ground Soybean +Peanut Oil | .89 lbs+9.8 fl oz | 3.77 |

[a]Supplements added on a protein equivalent basis.
[b]$LSD_{0.01}$ = 0.41 lbs/ft$^2$; $LSD_{0.05}$ = 0.31 lbs/ft$^2$.

The above described tests tend to confirm the following:

Formaldehyde denatured pellets (Liquid and Low Volume Liquid Methods) demonstrated high mold resistance as measured by the mold resistance tests. While results were mixed, spawn growth in jars supplemented with formaldehyde denatured pellets (especially formaldehyde denatured soybean protein grits) was much better than that for the untreated pellets.

In crop tests formaldehyde denatured pellets yielded significantly better than non-denatured pellets. Formaldehyde denaturing improved the overall suitability of pelleted supplements for use at spawning since it increased resistance to molding.

Formaldehyde readily combines with the amino group of amino acids to give less soluble methylol derivatives as discussed in Lenniger, Biochemistry, Worth Publisher Inc., New York, New York, (1970) (Chapter 4). Formaldehyde also alters the hydrogen bonding thereby changing the secondary and tertiary structure of the protein.

The Vapor, Liquid and Low Volume Liquid Formaldehyde denaturing imparted mold resistance to all the supplements treated during the investigation. The Low Volume method is preferred as compared to the other methods since it imparted greater mold resistance to the supplements.

Low Volume Formaldehyde denaturing of all supplements delayed their availability in the compost as reflected by temperature trends following supplementation at spawning. No excessive heating occurred with any formaldehyde denatured supplements when added with or without peanut oil, at normal or 1½ times normal rates. Some gradual and moderate heating sometimes occurred with those supplements 8–14 days after spawning. This period was coincident with rapid mycelial growth and thus probably represents direct stimulation of the mycelium by the supplement.

Formaldehyde denatured ground soybeans did not cause significant heat production early in spawn growth. Yields were significantly stimulated during both early and later flushes. yield increases of 50 and 75% were obtained when this supplement was added alone, and with peanut oil, respectively. Both a reduction of heating and increased and prolonged stimulation of crop yields reflect the delayed and gradual release of this supplement.

Formaldehyde denatured spray dried cottonseed protein greatly reduced heat production in compost as compared to nondenatured spray dried cottonseed protein. Yield increases of 55% occurred. Both early and later flushes were significantly stimulated. These results indicate that a delayed and gradual release of this supplement occurred.

Formaldehyde denatured cottonseed protein did not cause significant heat production during spawn run. Significant yield increases of 25% over the controls and non-denatured cottonseed protein were obtained. Crop increases were significantly greater than the controls over the first 3 flushes, but not over the last 4. On dumping, a moderate growth of *Trichoderma sp*, and other molds was observed in the compost. This mold growth, especially that of *Trichoderma sp*, could have limited the stimulations of mushroom yields considerably. The reduction of heat production of formaldehyde denatured cottonseed protein over non-denatured cottonseed protein indicates that this supplement is delayed and/or gradual in its availability to the microflora of the compost.

Formaldehyde denatured cottonseed protein plus peanut oil did not cause significant heat production early in spawn run, but did cause a gradual heating after days 7–8. Yield increases of 44% over the controls occurred with crop yields significantly greater over the first 3 flushes, but not over the last 4 flushes. On dumping a moderate growth of *Trichoderma sp* was observed in trays supplemented with formaldehyde denatured cottonseed protein plus peanut oil. In some instances yields were inhibited, although not significantly. This inhibition may have been the result of a heavy growth of *Trichoderma sp* in the compost. This mold growth stimulation was considered to be more a result of the peanut oil than the formaldehyde denatured supplements, since it occurred in all trays containing peanut oil, and only in those trays.

Formaldehyde denatured soybean protein grits with or without peanut oil, at normal and higher rates, did not cause significant heat production early in spawn run. A gradual temperature increase did occur during the second week of spawn run and coincided with rapid mycelial growth. Supplementation at spawning with formaldehyde denatured soybean protein grits significantly stimulated crop yields, resulting in increases of 35% above the controls. Yield increases were significant for the first 3, but not the last 4 flushes. The lack of mold growth and reduced heat production indicate that formaldehyde denatured soybean protein grits is more gradually available to the microflora of the compost than the non-denatured supplements.

Another method of denaturing protein is heating the supplement to high temperatures. Heating breaks hydrogen bonding and fragments protein into shorter peptide chains as discussed in Lenniger, supra, resulting in reduced solubility.

When heat denatured cottonseed protein was added to the compost (spawn vs. mold growth test) mold growth was greatly inhibited, as compared to non-denatured cottonseed protein, and spawn growth slightly stimulated, as compared to the controls. Availability of this supplement, as monitored by temperature data, was delayed at least 8 days. No severe heating occurred when the supplements were added with and without peanut oil, at the normal and 1½ times the normal rates. A gradual temperature increase occurred (after day 8) when heat denatured cottonseed protein plus peanut oil was added to the compost. This corresponded to observed mycelial stimulation and may reflect direct use of the supplement by the mushroom mycelium. This conclusion is further supported by yield stimulation. Compost supplemented with heat denatured cottonseed protein along did not heat up significantly after 8 days of spawn growth. The utilization of this supplement by the mushroom mycelium, as evidenced by significant crop stimulation, may be delayed longer than the temperature recordings or be too gradual to be reflected by compost temperature increases.

In one test, trays supplemented with heat denatured cottonseed protein and heat denatured cottonseed protein plus peanut oil yielded significantly higher than the control trays for the first 3 and last 4 flushes. This represents an overall increase of 33% for the heat denatured cottonseed alone and 57% for the heat denatured cottonseed protein-oil combination.

The effect of the vegetable oils, such as peanut oils, is synergistic for stimulating crop yields. The use of peanut oil alone tends to increase the growth of molds and can have the effect of inhibiting crop yields. In combination with the denatured protein, however, the vegetable oil tends to significantly stimulate spawn growth and ultimate crop yields.

The use of proteins denatured by methods other than formaldehyde denaturing or heat denaturing would probably provide comparable results to those described above using these methods.

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. In a process of growing mushroom mycelium in a compost bed, the improvement comprising supplementing the nutrients available in said compost with a denatured protein, wherein said denatured protein may be admixed into said compost during a time period commencing at the time of spawning of the mycelium into said compost and ending before said mycelium is established in said compost, whereby said denatured protein is essentially unavailable to other competing microorganisms present in said compost, but is gradually available to said mycelium as the mycelium develops.

2. The process of claim 1, wherein said denatured protein has a nitrogen content of from 4 to 15%.

3. The process of claim 1, wherein said denatured protein is admixed into said compost in an amount based on ½ to 4 pounds denatured protein per 4 square feet of surface area of compost bed when the bed has a depth of 5 inches.

4. The process of claim 1, wherein said protein is a heat denatured protein.

5. The process of claim 1, wherein said protein is a formaldehyde denatured protein.

6. The process of claim 5, wherein said formaldehyde denatured protein is spray dried.

7. The process of claim 5, wherein said formaldehyde denatured protein is in pellet form.

8. The process of claim 1, wherein the protein which is denatured is in the form of cottonseed, or soybean meal.

9. In a process of growing mushroom mycelium in a compost bed, the improvement comprising supplementing the nutrients available in said compost with a denatured protein, wherein said denatured protein may be admixed into said compost during a time period comencing before the spawning of the mycelium into said compost and ending before said mycelium is established in said compost, whereby said denatured protein is essentially unavailable to other competing microorganisms present in said compost, but is gradually available to said mycelium as the mycelium develops and wherein said denatured protein is admixed with a vegetable or fish oil.

10. The process of claim 9, wherein said oil is peanut oil.

11. The process of claim 9, wherein said admixture of denatured protein and oil is formed by spray drying a mixture of protein and oil to form an encapsulate of protein surrounding said oil, and thereafter denaturing said protein.

12. A growth medium for mushroom mycelium which comprises the admixture of a mushroom compost and a nutrient improving amount of a denatured protein.

13. The medium of claim 12, wherein said denatured protein has a nitrogen content of from 4 to 15%.

14. The medium of claim 12 wherein said denatured protein is admixed into said compost in an amount based on ½ to 4 pounds denatured protein per 4 square feet of surface area of compost bed when the bed has a depth of 5 inches.

15. A growth medium for mushroom mycelium which comprises the admixture of a mushroom compost, a denatured protein and a vegetable or fish oil.

16. The medium of claim 15, wherein said oil is a vegetable oil.

* * * * *

UNITED STATES PATENT OFFICE
CERTIFICATE OF CORRECTION

Patent No. 3,942,969                    Dated March 9, 1976

Inventor(s) Alban D. Carroll et al

It is certified that error appears in the above-identified patent and that said Letters Patent are hereby corrected as shown below:

Cover page, column 1, insert

--[73] Assignee:   Research Corporation, 405 Lexington Avenue, New York, N.Y. 10017--

Column 2, line 44, insert a period (.) after "spawning".

Column 3, line 57, correct the spelling of "solubilized".

Column 4, line 61, correct the spelling of "solubility".

Column 6, line 24, close the parenthesis around the word "depth".

Column 13, line 21, change "yield" to --Yield--.

Column 14, line 32, change "along" to --alone--.

Signed and Sealed this

Fourteenth Day of September 1976

[SEAL]

Attest:

RUTH C. MASON
Attesting Officer

C. MARSHALL DANN
Commissioner of Patents and Trademarks

REEXAMINATION CERTIFICATE (153rd)

United States Patent [19]

Carroll, Jr. et al.

[11] B1 3,942,969

[45] Certificate Issued  Jan. 10, 1983

[54] DELAYED RELEASE NUTRIENTS FOR MUSHROOM CULTURE

[75] Inventors: Alban D. Carroll, Jr., Fleetwood; Lee C. Schisler, State College, both of Pa.

[73] Assignee: Research Corp., New York, N.Y.

Reexamination Request:
No. 90/000,305, Dec. 13, 1982

Reexamination Certificate for:
Patent No.: 3,942,969
Issued: Mar. 9, 1976
Appl. No.: 471,893
Filed: May 21, 1974

Certificate of Correction issued Sep. 14, 1976.

[51] Int. Cl.³ .......................... C05F 5/00; A01G 1/04
[52] U.S. Cl. .......................................... 71/5; 47/1.1
[58] Field of Search .................................. 71/5; 47/1.1

[56] References Cited

U.S. PATENT DOCUMENTS

| | | | |
|---|---|---|---|
| Re.22,202 | 10/1942 | Stoller | 71/5 |
| Re.27,790 | 10/1973 | Rusoff et al. | 99/14 |
| Re.28,091 | 7/1974 | Heusdens et al. | 426/148 |
| 1,857,914 | 5/1932 | Keyssner et al. | |
| 2,005,365 | 6/1935 | Di Giacinto | 47/1 |
| 2,369,439 | 2/1945 | Cupery | 260/6 |
| 2,500,453 | 3/1950 | Danehy | 260/119 |
| 2,505,811 | 5/1950 | Szuecs | |
| 2,506,253 | 5/1950 | Thomson et al. | 8/127.6 |
| 2,532,350 | 12/1950 | Thomson et al. | 8/127.6 |
| 2,533,297 | 12/1950 | Thomson | 8/127.6 |
| 2,565,908 | 8/1951 | Campbell et al. | 8/127.6 |
| 2,618,900 | 11/1952 | Humfeld | 47/1.1 |
| 2,648,163 | 8/1953 | Szuecs | |
| 2,714,553 | 8/1955 | Bibb et al. | 71/23 |
| 2,868,773 | 1/1959 | Kress | 260/112 |
| 3,205,061 | 9/1965 | Mason | 71/28 |
| 3,223,518 | 12/1965 | Hansen | 71/64 |
| 3,286,399 | 11/1966 | Laniece | 47/1.1 |
| 3,303,182 | 2/1967 | Sakai et al. | 260/123.5 |
| 3,440,071 | 4/1969 | Stephen | 106/154 |
| 3,442,637 | 5/1969 | Hudson et al. | 71/12 |
| 3,515,711 | 6/1970 | Richards et al. | 260/112 |
| 3,560,190 | 2/1971 | Hughes et al. | 71/5 |

(List continued on next page.)

OTHER PUBLICATIONS

Ault, K. G. 1972. "Pelleting" A paper read at the Pennsylvania Feed Industries Conference, Mar. 7, 1972.
Block, S. and S. N. Rao. 1962. Sawdust Compost for Mushroom Culture. Mushroom Science V: 134-142.

[57] ABSTRACT

Denatured protein is used as a nutrient supplement for the stimulation of the growth of mushroom mycelium. The denatured protein is admixed into the compost growing medium before or shortly after spawning. A synergistic effect is attained by admixing a vegetable oil, or fish oil with the denatured protein.

*Primary Examiner*—Ferris H. Lander

U.S. PATENT DOCUMENTS

| | | | |
|---|---|---|---|
| 3,567,419 | 3/1971 | Dean et al. | 71/11 |
| 3,619,200 | 11/1971 | Ferguson | 99/2 |
| 3,634,093 | 1/1972 | Huang | 99/2 |
| 3,649,293 | 1/1972 | Hoer et al. | 99/17 |
| 3,821,453 | 6/1974 | Hoer | 426/506 |
| 3,828,470 | 8/1974 | Stoller | 47/1.4 |
| 3,849,391 | 11/1974 | Egger et al. | 260/123.5 |

OTHER PUBLICATIONS

Delmas, J. and J. Labrode. 1968. Supplementation at Casing with Soybean By-products and Total Mushroom Yield as Influenced by Different Forms of Nitrogen Used During Composting. Mushroom Science VII: 309-328.

Ferguson, K. A., J. A. Hemsley, and P. J. Reis. 1967. Nutrition and Wool Growth. The Effect of Protecting Dietary Protein from Microbial Degradation in the Rumen. Australian Journal of Science 30: 215-217.

Flegg, P. B. 1961. Mushroom Compost and Composting. A review of the Literature. Glasshouse Crops Research Institute. Littlehampton, England, Annual Report 1960: 125-134.

Hauser, E. and J. W. Sinden. 1959. Mixed Spawning. Mushroom Growers Association Bulletin 110: 39-40.

Hayes, W. A. 1968. Microbiological Changes in Composting Wheat Straw/Horse Manure Mixtures. Mushroom Science V: 150-164.

Hein, I. 1930. Straw Compost for Mushroom Culture. Mycologia 22: 39-43.

Lenninger, A. L. 1970. Biochemistry. Worth Publisher Inc., New York, NY. Chapter 4.

MacCanna, C. 1968. Nitrogen Supplementation of Composts. Mushroom Science VII: 295-307.

Pfoust, H. B. 1964. Effect of Lignin Binders, Die Thickness and Temperature on the Pelleting Process. Feedstuffs 36(22): 20. (Aug. 11, 1962).

Schisler, L. C. and J. W. Sinden. 1962. Nutrient Supplementation of Mushroom Compost at Spawning. Mushroom Science V: 150 ∝ 164.

Schisler, L. C. 1964. Nutrient Supplementation of Compost During the Mushroom Growth Cycle. Mushroom Growers Assocation Bulletin 179: 503-541.

Schisler, L. C. 1965. Nutrient Supplementation of Compost During the Mushroom Growth Cycle. Mushroom News, Apr. (p. 12-19), May (p. 8-17), Jun. (p. 4-14), 1965.

Schisler, L. C. et al. 1966. Nutrient Supplementation of Mushroom Compost at Casing: Vegetable Oils. Can. J. Botany 44: 1063-1069.

Schisler, L. C. 1967. Stimulation of Yield in the Cultivated Mushroom by Vegetable Oils. Applied Microbiology 15(4): 844-850.

Schisler, L. C. 1970. Supplementation of Mushroom Compost. Mushroom News 18(4): 13-21, Apr.-May, 1970.

Schisler, L. C. and T. Patton. 1970. Stimulation of Mushroom Yield by Supplementation with Vegetable Oil Before Phase II of Composting. Journal of the American Society for Horticultural Science 95:(5), 595-597, Sep. 1970.

Schisler, L. C. and T. Patton. 1970. Stimulation of Yield in the Cultivated Mushroom by Vegetable Oils. Effects of Sterols and Ethyl Linoleate. J. Agr. Food Chem. 18(6): 1102-1103, Nov./Dec. 1970.

Schisler, L. C. 1971. Supplementation of the Finished Compost at the Time of Spawning, at Time of Casing, and Later. Mushroom News 19(4): 3-13, Apr. 1971.

Schisler, L. C. and T. Patton. 1971. Stimulation of Mushroom Yields by Supplementation with Vegetable Oils Before Phase II of Composting. Mushroom News, Feb. 1971.

Schisler, L. C. and T. Patton. 1971. Yield Response of Selected Mushroom Strains to Vegetable Oil Supplementation. Mushroom Science VIII: 707-712.

Scott, J. W. and L. J. Cook. 1970. Polyunsaturated Milk-fat; A New Development from Australia. Agricultural Science Review, Fourth Quarter: 25-28.

Sinden, J. W. and E. Hauser. 1950. The Sort Method of Composting. Mushroom Science I: 52-59.

Sinden, J. W. and E. Hauser, 1953. The Nature of the Composting Process and Its Relation to Short Composting. Mushroom Science II: 123-131.

Sinden, J. W. and L. C. Schisler. 1962. Nutrient Supplementation of Mushrooms Compost at Casing. Mushroom Science V: 267-280.

Yound, A. and H. B. Pfoust. 1962. Colloidal Binders and Other Factors on Pellets. Feedstuffs 34: 36-38. (May 30, 1964).

S. J. Circle and A. K. Smith. 1980. Soybeans: Chemistry and Technology. vol. I-Products. pp. 294-338.

Food Proteins, Whitaker & Tannenbaum, 1977, pp. 14-49.

Chemical Deterioration of Proteins, 1980, Whitaker, et al. pp. 1-47.

Advances in Protein Chemistry, Anson et al., 1945, pp. 361-386.

Protein Denaturation, Tanford, Advances in Protein Chemistry, vol. 23 (1968) pp. 121-283.

Some Factors in the Interpretation of Protein Denaturation, Kauzmann, Advances in Protein Chemistry, vol. XIV, 1959, pp. 1-5.

REEXAMINATION CERTIFICATE ISSUED UNDER 35 U.S.C. 307.

DELAYED RELEASE NUTRIENTS FOR MUSHROOM CULTURE

NO AMENDMENTS HAVE BEEN MADE TO THE PATENT.

AS A RESULT OF REEXAMINATION, IT HAS BEEN DETERMINED THAT:

The patentability of claims 1-16 is confirmed.

* * * * *